Patented Aug. 3, 1943

2,325,982

UNITED STATES PATENT OFFICE 2,325,982

SOFTENER FOR SYNTHETIC RUBBER

Donald V. Sarbach, Cuyahoga Falls, Ohio, assignor to The B. F. Goodrich Company, New York, N. Y., a corporation of New York No Drawing. Application September 12, 1941, Serial No. 410,594

10 Claims. (Cl. 260—36)

This invention relates to a new class of softeners for synthetic rubber and to the improved compositions obtainable by the use of such softeners.

In comparison to natural rubber, synthetic rubber is relatively hard, dry and non-tacky and, unlike natural rubber, is incapable of being masticated to a soft plastic condition in which it may readily be compounded and processed. Accordingly, it is necessary to employ softeners or plasticizers in order to improve its compounding and processing characteristics. The selection of suitable softeners for synthetic rubber has, however, presented numerous difficulties particularly in the case of synthetic rubber of the type prepared by the copolymerization of a butadiene-1,3 hydrocarbon and an acrylic nitrile. These difficulties are accentuated by the fact that many softeners ordinarily employed in rubbery or resinous materials are incompatible with this and other types of synthetic rubber and by the further fact that softeners for one type of synthetic rubber do not in all cases function similarly in other types of synthetic rubber. Even varying the proportions of the monomers in the mixtures employed to form copolymers often necessitates the search for new softeners for the synthetic rubber product. Aside from these difficulties some softeners which are compatible with synthetic rubber so adversely affect the properties of vulcanizates prepared from compositions containing them as to preclude their use.

I have now discovered that chlorinated triaryl phosphates are excellent softeners for any of the synthetic rubbers prepared by the polymerization of a butadiene-1,3 hydrocarbon either alone or in admixture with one or more other polymerizable compounds. These esters impart to both unvulcanized and vulcanized synthetic rubber compositions certain desirable properties which do not accompany the use of softeners in general and which are not even obtained when unchlorinated triaryl phosphates are employed.

The chlorinated triaryl phosphate softeners of this invention are triaryl esters of phosphoric acid wherein at least one of the aryl groups contains at least one ring-substituted chlorine atom. Included in this class of compounds there may be mentioned the various chlorinated triphenyl phosphates, chlorinated tricresyl phosphates, chlorinated trixylyl phosphates, chlorinated trimesityl phosphates, chlorinated trinaphthyl phosphates, etc. Specific compounds which may be employed are, for example, tri-orthochlorophenyl phosphate, tri-(2,4-dichlorophenyl) phosphate, tri-(2-methyl-4-chlorophenyl) phosphate, tri-(2,4-dimethyl-3-chlorophenyl) phosphate, tri-chloronaphthyl phosphate and the like. Mixed esters of phosphoric acid wherein the three hydrogen atoms of the phosphoric acid molecule are replaced with three aryl groups which are not all the same and at least one of which contains at least one ring-substituted chlorine atom such as orthochlorophenyl diphenyl phosphate, orthochlorophenyl dinaphthyl phosphate, di-(2,4-dichlorophenyl) ortho-cresyl phosphate, 2-methyl-4-chlorophenyl-di-cresyl phosphate, orthochlorophenyl-phenyl-naphthyl phosphate, 2,4-diethyl phenyl-di-orthochlorophenyl phosphate, trichlorophenyl-di-orthochlorophenyl phosphate, 2,4-dimethyl-3-chlorophenyl-di-xylyl phosphate and the like may also be employed.

Since these compounds are usually prepared by the chlorination of triaryl phosphates or by the reaction of phenols with phosphorous oxychloride and since such reactions often yield complex mixtures rather than single chemical compounds, it is usually more convenient to employ such mixtures rather than pure chemical compounds. Such mixtures are sometimes designated by the degree of chlorination of the triaryl phosphate rather than by the nature of the specific compounds present in the mixture. For example, a material obtained by chlorinating tricresyl phosphate and having a chlorine content of 10% probably consists of a mixture of several compounds but is designated simply as 10% chlorinated tricresyl phosphate. When such mixtures are employed those having a chlorine content of from 5 to 50% by weight are preferred.

As mentioned hereinabove these, chlorinated triaryl phosphates may be employed as softeners for synthetic rubber prepared by the polymerization of a butadiene-1,3 hydrocarbon, by which is meant butadiene-1,3 and its homologs which polymerize in essentially the same manner such as isoprene, 2-3 dimethyl butadiene-1,3, piperylene, etc., either alone or in admixture with other butadiene-1,3 hydrocarbons or with other unsaturated monomers copolymerizable therewith. Among such unsaturated monomers copolymerizable with a butadiene-1,3 hydrocarbon to form synthetic rubber there may be mentioned the aryl olefins such as styrene and vinyl naphthalene; the alpha methylene carboxylic acids, and their esters, nitriles and amides such as acrylic acid, methyl acrylate, methyl methacrylate, acrylonitrile, methacrylonitrile, methacrylamide and the like; isobutylene, methyl vinyl ether; methyl vinyl ketone; vinylidene chloride and other unsaturated hydrocarbons, esters, alcohols, acids, ethers, etc., which contain the polymerizable structure

where at least one of the disconnected valencies is attached to an electro-active group, that is, a group which substantially increases the electrical dissymmetry or polar character of the molecule.

The polymerization to form a synthetic rubber may be accomplished by any of the well known methods such as homogeneous polymerization, polymerization in aqueous emulsion, etc.

The incorporation of the softener with the synthetic rubber may be effected by any desired method as by adding the softener to synthetic rubber while the rubber is being worked on a roll mill, masticating a mixture of the rubber and softener in an internal mixer such as a Banbury type mixer, adding the softener to an emulsion or dispersion of the synthetic rubber or by adding the softener to a solution of the rubber in a solvent.

The amount of the softener added will depend upon the properties desired in the composition and upon the nature of the rubber treated, the rubber and the softener being compatible over a wide range of proportions. In commercial operations it will ordinarily be expedient to employ from about 10 to 60 parts by weight of the softener for each 100 parts of synthetic rubber but amounts smaller or larger than this ranging from 1 to 100 parts of softener for 100 parts of synthetic rubber are also effective. With synthetic rubber prepared by the copolymerization of butadiene and styrene or of butadiene and acrylic esters it is possible to use smaller amounts of softener than are required with rubber prepared by the copolymerization of butadiene and acrylic nitrile.

In one embodiment of this invention a batch consisting of 100 parts by weight of a synthetic rubber prepared by the copolymerization in aqueous emulsion of 55 parts by weight of butadiene-1,3 and 45 parts by weight of acrylonitrile is broken down on a roll mill at 120–130° F. 50 parts of chlorinated tricresyl phosphate containing about 7.5% by weight of chlorine are then added as fast as the softener is absorbed by the copolymer. Milling is difficult at first but as the softener is added the workability improves until at the end of the addition a soft plastic batch is obtained. The conventional pigments, sulfur and a vulcanization accelerator are then added to produce a soft, plastic and moderately tacky unvulcanized composition.

When the above composition is vulcanized a vulcanizate having excellent tensile strength and elongation is produced. The tensile strength of this vulcanizate, for example, is over 500 lbs./sq. in. more than a similar vulcanizate wherein tricresyl phosphate is employed as the softener and the ultimate elongation is over 100% more. The vulcanizate also possesses unusually good heat resistance and is non-inflammable, neither of these properties being obtained with many ordinary softeners.

In another example, only 10 parts by weight of the chlorinated tricresyl phosphate softener employed above is incorporated in 100 parts by weight of a synthetic rubber prepared by copolymerizing in aqueous emulsion butadiene-1,3 and styrene. The softener adds easily to the synthetic rubber and greatly improves its milling properties especially at high temperatures. When the resulting softened composition is compounded and vulcanized, vulcanizates having excellent tensile strength and elongation and also possessing superior heat and flame resistance are obtained.

In still another embodiment of the invention 50 parts by weight of tri-orthochlorophenyl phosphate are incorporated in 100 parts by weight of a synthetic rubber prepared by copolymerizing in aqueous emulsion 55 parts by weight of butadiene-1,3 and 45 parts by weight of butadiene-1,3 and 45 parts by weight of acrylonitrile. A softened composition which may be easily compounded and processed even at high temperatures is produced. When this composition is compounded with the ordinary pigments, sulfur and an accelerator and then cured, vulcanizates having excellent tensile strength and elongation, high durometer hardness and excellent heat resistance are obtained. The vulcanizates also retain the excellent oil resistance of unsoftened butadiene acrylonitrile copolymers.

It is to be understood that the above examples have been given by way of illustration only and are not intended to limit this invention in any respect. Other softeners in this class may be incorporated in other synthetic rubbers prepared by the polymerization of a butadiene-1,3 hydrocarbon to produce excellent unvulcanized and vulcanized compositions. Other materials such as natural rubber, other softeners, pigments, fillers, vulcanizing agents, accelerators, antioxidants and the like may be included in the compositions herein described. Still other modifications which will be apparent to those skilled in the art are also within the spirit and scope of the invention as defined by the appended claims.

I claim:

1. A composition of matter comprising a synthetic rubber prepared by the polymerization of a butadiene-1,3 hydrocarbon and, as a softener therefor, a chlorinated triaryl phosphate having a chlorine content of 5 to 50%.

2. A composition of matter comprising a synthetic rubber prepared by the copolymerization of a butadiene-1,3 hydrocarbon and at least one other unsaturated compound which contains a

group and is copolymerizable therewith and, as a softener therefor, a chlorinated triaryl phosphate having a chlorine content of 5 to 50%.

3. A composition of matter comprising a synthetic rubber prepared by copolymerizing in aqueous emulsion butadiene-1,3 and acrylonitrile and, as a softener therefor, a chlorinated triaryl phosphate having a chlorine content of 5 to 50%.

4. A composition of matter comprising a synthetic rubber prepared by copolymerizing in aqueous emulsion butadiene-1,3 and styrene and, as a softener therefor, a chlorinated triaryl phosphate having a chlorine content of 5 to 50%.

5. The composition of claim 1 wherein the softener is a chlorinated tricresyl phosphate having a chlorine content of 5 to 50%.

6. The composition of claim 3 wherein the softener is a chlorinated tricresyl phosphate having a chlorine content of 5 to 50%.

7. The composition of claim 4 wherein the softener is a chlorinated tricresyl phosphate having a chlorine content of 5 to 50%.

8. The composition of claim 1 wherein the softener is tri-orthochlorophenyl phosphate.

9. The composition of claim 3 wherein the softener is tri-orthochlorophenyl phosphate.

10. A synthetic rubber composition prepared by vulcanizing a polymer of a butadiene-1,3 hydrocarbon in the presence of a chlorinated triaryl phosphate having a chlorine content of 5 to 50%.

DONALD V. SARBACH.